US008004512B2

(12) United States Patent
Rao et al.

(10) Patent No.: US 8,004,512 B2
(45) Date of Patent: Aug. 23, 2011

(54) POWER-ON SCREEN PATTERN CORRECTING APPARATUS AND SOURCE DRIVER USING THE SAME

(75) Inventors: Yong-Nien Rao, Hsinchu (TW); Ko-Yang Tso, Taipei County (TW); Hui-Wen Miao, Hsinchu (TW); Chin-Chieh Chao, Hsinchu (TW)

(73) Assignee: Raydium Semiconductor Corporation, Hsinchu (TW)

( * ) Notice: Subject to any disclaimer, the term of this patent is extended or adjusted under 35 U.S.C. 154(b) by 882 days.

(21) Appl. No.: 12/010,354

(22) Filed: Jan. 24, 2008

(65) Prior Publication Data

US 2008/0180425 A1 Jul. 31, 2008

(30) Foreign Application Priority Data

Jan. 26, 2007 (TW) ................................ 96103084 A

(51) Int. Cl.
*G06F 3/038* (2006.01)

(52) U.S. Cl. ......................... 345/211; 713/300; 713/340

(58) Field of Classification Search .......... 345/211–213; 713/300–340
See application file for complete search history.

(56) References Cited

U.S. PATENT DOCUMENTS

| | | | | |
|---|---|---|---|---|
| 5,736,873 | A * | 4/1998 | Hwang | 327/41 |
| 2001/0022582 | A1 * | 9/2001 | Arai et al. | 345/204 |
| 2004/0252116 | A1 * | 12/2004 | Tobita | 345/211 |
| 2005/0108584 | A1 * | 5/2005 | Kawakami et al. | 713/300 |

* cited by examiner

*Primary Examiner* — Lun-Yi Lao
*Assistant Examiner* — Shaheda A Abdin
(74) *Attorney, Agent, or Firm* — Rabin & Berdo, P.C.

(57) ABSTRACT

A power-on screen pattern correcting apparatus is for correcting start output data of output terminals of a source driver such that a power-on screen pattern of a display is substantially uniform. The correcting apparatus comprises a flip-flop, a first logic unit and a second logic unit. The flip-flop controls a level of an inner signal to be substantially equal to a low signal level in response to a low level of a power start signal. The first logic unit enables a first signal in response to the low level of the inner signal or a low level of a high-impedance control signal. The second logic unit enables a second signal such that the output terminals are coupled to a charge sharing line and the power-on screen pattern is uniform in response to the low level of the inner signal or a low level of a charge-sharing control signal.

11 Claims, 3 Drawing Sheets

POWER-ON SCREEN PATTERN CORRECTING APPARATUS AND SOURCE DRIVER USING THE SAME

This application claims the benefit of Taiwan application Serial No. 96103084, filed Jan. 26, 2007, the subject matter of which is incorporated herein by reference.

BACKGROUND OF THE INVENTION

1. Field of the Invention

The invention relates in general to a power-on screen pattern correcting apparatus, and more particularly to a power-on screen pattern correcting apparatus which can adjust a power-on screen pattern of a display to be substantially uniform.

2. Description of the Related Art

Referring to FIG. 1, a circuit diagram of a latch of a source driver in a conventional display is shown. A latch 100 receives a piece of input data In, latches phase-inverted data of the input data In at a node P via timing signals C1 and C1B, and accordingly generates output data Out. When the display is powered on and display data has not yet been transmitted to the display, the data latched at each latch 100 of the source driver may vary randomly to form random data due to non-ideal factors of the circuit. As a result, the power-on screen pattern of the display becomes a random pattern.

Conventionally, in order to solve the above issue that the power-on screen pattern of the display becomes a random pattern, an extra NAND gate 102 is disposed in the latch 100 to receive a power start signal R1, and by using the feature that the timing of the rising edge of the power start signal R1 is delayed by a fixed time compared to the time point when a power signal of the source driver rises up to a high signal level, each latch 100 of the source driver is set to have a high signal level at the node P and their output signals Out have a low signal level when the display is powered on.

However, the conventional improved circuit requires a huge number of extra NAND gates disposed in the source driver in order to solve the issue that the power-on screen pattern of the display becomes a random pattern. For example, a 384-channel source driver with each channel receiving 6 bits of red, green and blue (RGB) pixel data requires 384×6=2304 extra NAND gates. As a result, the area and cost of source driver is greatly increased owing that the latch 100*a* requires a lot of extra NAND gates.

SUMMARY OF THE INVENTION

The invention is directed to a power-on screen pattern correcting apparatus and source driver, which can effectively solve the conventional issue of requiring a large-area and high-cost source driver for correcting the power-on screen pattern of a display.

According to a first aspect of the present invention, a power-on screen pattern correcting apparatus is provided. The power-on screen pattern correcting apparatus is for correcting a plurality of pieces of start output data of a plurality of output terminals of a source driver such that a power-on screen pattern of a display is substantially uniform. The power-on screen pattern correcting apparatus comprises a flip-flop, a first logic unit and a second logic unit. The flip-flop is for controlling a level of an inner signal to be substantially equal to a low signal level in response to a low level of a power start signal. The first logic unit is for enabling a first signal in response to the low level of the inner signal or a low level of a high-impedance control signal. The second logic unit is for enabling a second signal in response to the low level of the inner signal or a low level of a charge-sharing control signal. When the first signal is enabled, the output terminals of the source driver are in a high-impedance state. When the second signal is enabled, the output terminals are coupled to a charge sharing line such that all the start output data is substantially equal and the power-on screen pattern is substantially uniform.

According to a second aspect of the present invention, a source driver is provided. The source driver is applied in a display for generating a plurality of pieces of start output data substantially equal such that a power-on screen pattern of the display is substantially uniform. The source driver comprises a charge sharing line, output buffers, output terminals, first switch units, second switch units and a power-on screen pattern correcting apparatus. The output terminals are for outputting the start output data. The power-on The power-on screen pattern correcting apparatus comprises a flip-flop, a first logic unit and a second logic unit. The flip-flop is for controlling a level of an inner signal to substantially equal to a low signal level in response to a low level of a power start signal. The first logic unit is for enabling a first signal in response to the low level of the inner signal or a low level of a high-impedance control signal. The second logic unit is for enabling a second signal in response to the low level of the inner signal or a low level of a charge-sharing control signal. Each of the first switch units comprises a first terminal coupled to the corresponding output terminal, a second terminal coupled to the corresponding output buffer and a control terminal for receiving the first signal. When the first signal is enabled, the first switch units are open such that the output terminals and the output buffers are open, and the output terminals are in a high-impedance state. Each of the second switch units comprises a first terminal coupled to the corresponding output terminal, a second terminal coupled to the charge sharing line, and a control signal for receiving the second signal. When the second signal is enabled, the second switch units are close such that the output terminals are substantially coupled to the charge sharing line, all the start output data is substantially equal and the power-on screen pattern is substantially uniform.

The invention will become apparent from the following detailed description of the preferred but non-limiting embodiments. The following description is made with reference to the accompanying drawings.

DETAILED DESCRIPTION OF THE INVENTION

The power-on screen pattern correcting apparatus of the invention generates two new control signals for controlling two sets of original switches by using three original control signals such that the start output data outputted at the output terminals of the source driver is substantially equal and the power-on screen pattern of the display using the source driver is substantially uniform.

Figure 1:
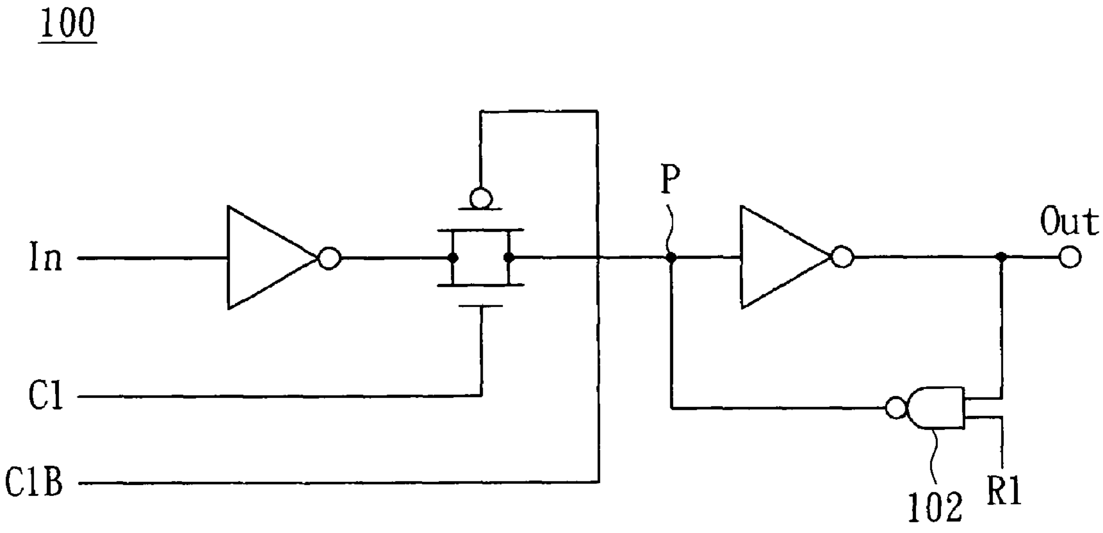
FIG. 1(PRIOR ART)
FIG. 1 is a circuit diagram of a latch of a source driver in a conventional display.
Figure 2:
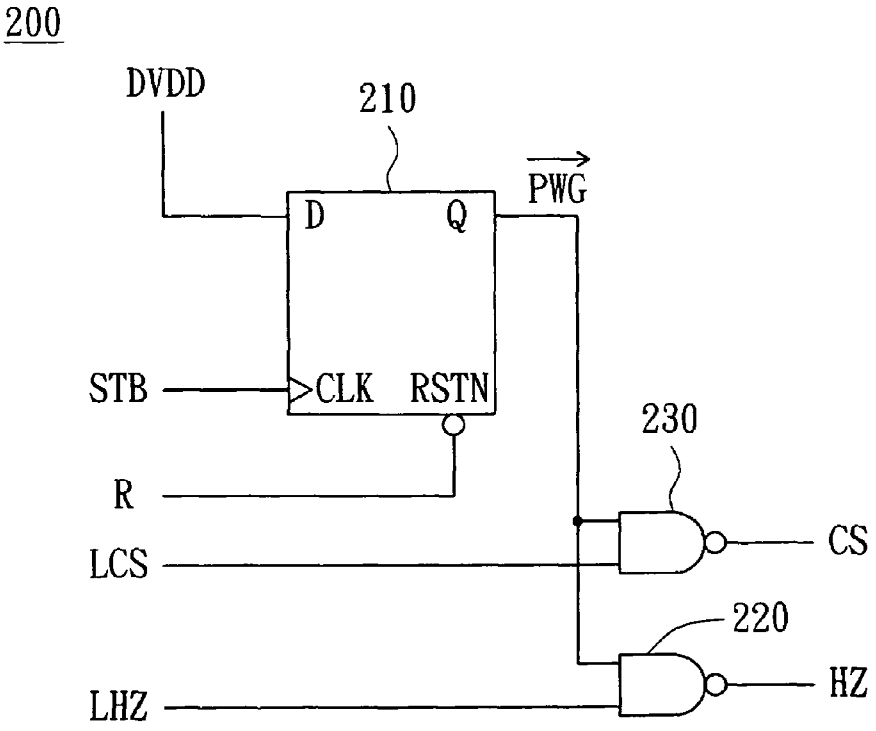
FIG. 2 is a block diagram of a power-on screen pattern correcting apparatus according to a preferred embodiment of the invention.
Figure 3:
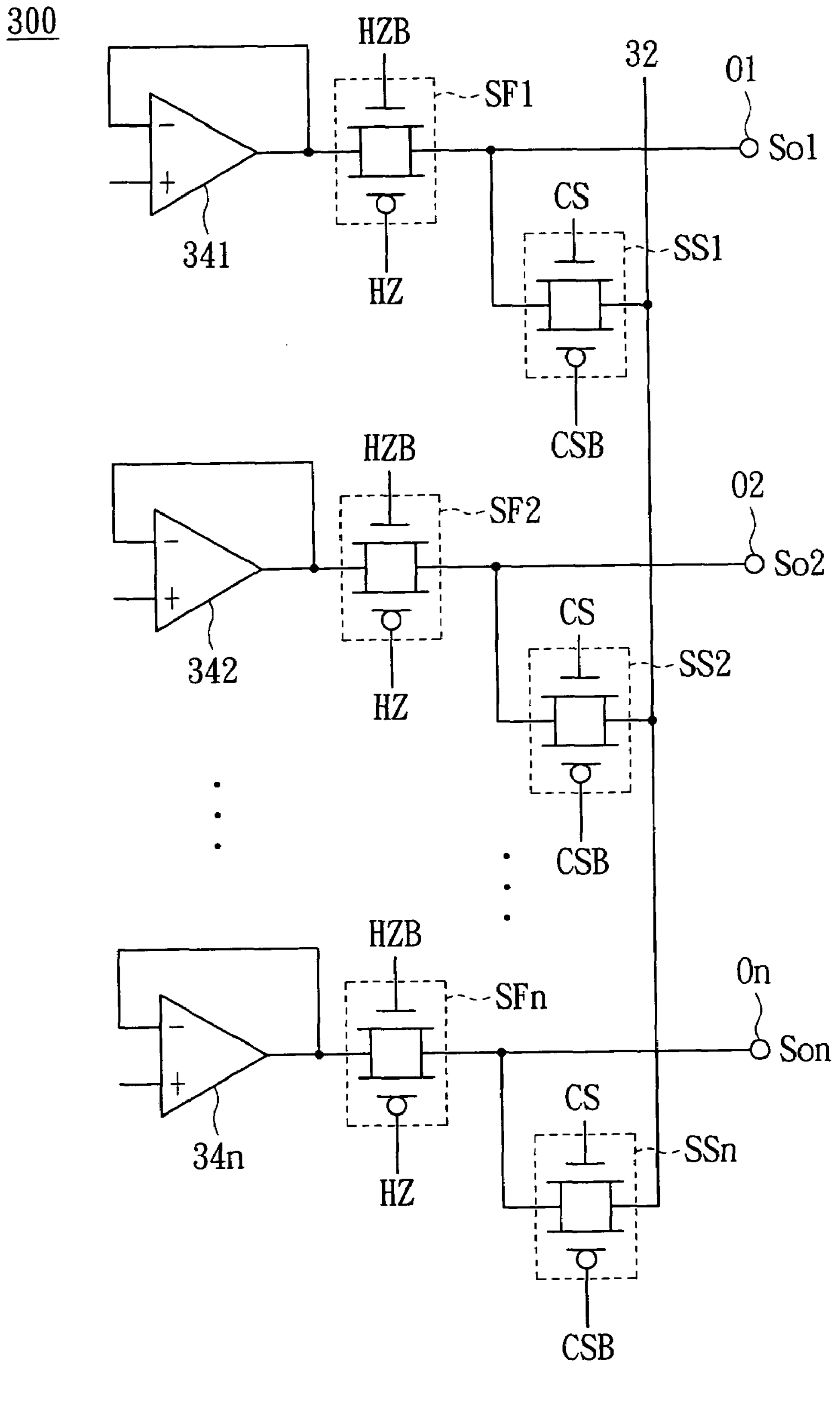
FIG. 3 is a partial circuit diagram of a source driver using the power-on screen pattern correcting apparatus of FIG. 2.

Referring to FIG. 2 and FIG. 3, a block diagram of a power-on screen pattern correcting apparatus according to a preferred embodiment of the invention and a partial circuit diagram of a source driver using the power-on screen pattern correcting apparatus 200 of FIG. 2 are respectively shown. A power-on screen pattern correcting apparatus 200 includes a flip-flop 210 and logic units 220 and 230. The power-on screen pattern correcting apparatus 200, applied in a source driver 300, is used for making a power-on screen pattern of the display using the source driver 300 substantially uniform.

The flip-flop 210 has a reset terminal RSTN for receiving a power start signal P. In the embodiment, the reset terminal RSTN of the flip-flop 210 is a control terminal triggered by a low-level signal. The flip-flop 210 controls an inner signal PWG outputted by its output terminal Q to have a level substantially equal to a low signal level in response to a low level of the power start signal P.

The logic unit 220 receives the inner signal PWG and a high-impedance control signal LHZ of the source driver and enables a signal HZ in response to the low signal level of the inner signal PWG or a low signal level of the high-impedance control signal LHZ. In the embodiment, the logic unit 220 is exemplified to be a NAND gate for illustration, and thus the signal HZ is enabled to have a high signal level for instance. The power-on screen pattern correcting apparatus 200 is for controlling the output terminals 01~0*n* and the corresponding output buffers 341~34*n* to be open in response to the enabled signal HZ such that the output terminals 01~0*n* are in a high-impedance state.

The logic unit 230 receives the inner signal PWG and a charge-sharing control signal LCS of the source driver and enables a signal CS in response to the low signal level of the inner signal PWG or a low signal level of the charge-sharing control signal LCS. In the embodiment, the logic unit 230 is a NAND gate and the signal CS is enabled to have a high signal level for instance. The power-on screen pattern correcting apparatus 200 controls the output terminals 01~0*n* to couple with a charge sharing line in response to the enabled signal CS such that the output data So1~Son initially outputted by the terminals 01~0*n* is substantially equal and the power-on screen pattern of the display is substantially uniform.

The source driver 300 includes switch units SF1~SFn and SS1~SSn. The switch units SF1~SFn have first terminals respectively coupled to the output terminals 01~0*n*, second terminals respectively coupled to the output buffers 341~34*n* and control terminals for receiving the signal HZ. When the signal HZ is enabled, the switch units SF1~SFn are all open such that the output terminals 01~0*n* and the corresponding output buffers 341~34*n* are substantially open and the output terminals are in the high-impedance state.

For example, the switch units SF1~SFn are implemented by complementary metal oxide semiconductor (CMOS) transistors in which the gates of a p-type metal oxide semiconductor (PMOS) transistor and a n-type metal oxide semiconductor (NMOS) transistor respectively receive the signal HZ and its complementary signal HZB. When the signal HZ is enabled, the signal HZ has a high signal level and thus the switch units SF1~SFn are open in response to the enabled signal HZ such that the output terminals 01~0*n* are in the high-impedance state. The switch units SF1~SFn are close in response to a low level of the signal HZ. The signal passing the switch units SF1~-SFn is a rail-to-rail signal for instance.

The switch units SS1~SS2 have first terminals respectively coupled to the output terminals 01~0*n*, second terminals coupled to the charge sharing line 32 and control terminals for receiving the signal CS. When the signal CS is enabled, the switch units SS1~SS2 are close such that the output terminals 01~0*n* are all substantially coupled to the charge sharing line 32. Therefore, the output data So1~Son outputted by the output terminals 01~0*n* is substantially equal and thus the power-on screen pattern of the display is substantially uniform.

In the embodiment, the switch units SS1~SSn are implemented by CMOS transistors in which the gates of a NMOS transistor and a PMOS transistor respectively receive the signal CS and its complementary signal CSB. The signal CS has a high signal level as enabled. Therefore, the switch units SS1~SSn are close in response to the high level of the signal CS such that the output terminals 01~0*n* are substantially coupled to the charge sharing line 32. The switch units SS1~SSn are open in response to a low level of the signal CS, and the signal passing the switch units SS1~SSn is a rail-to-rail signal for instance.

Figure 4:
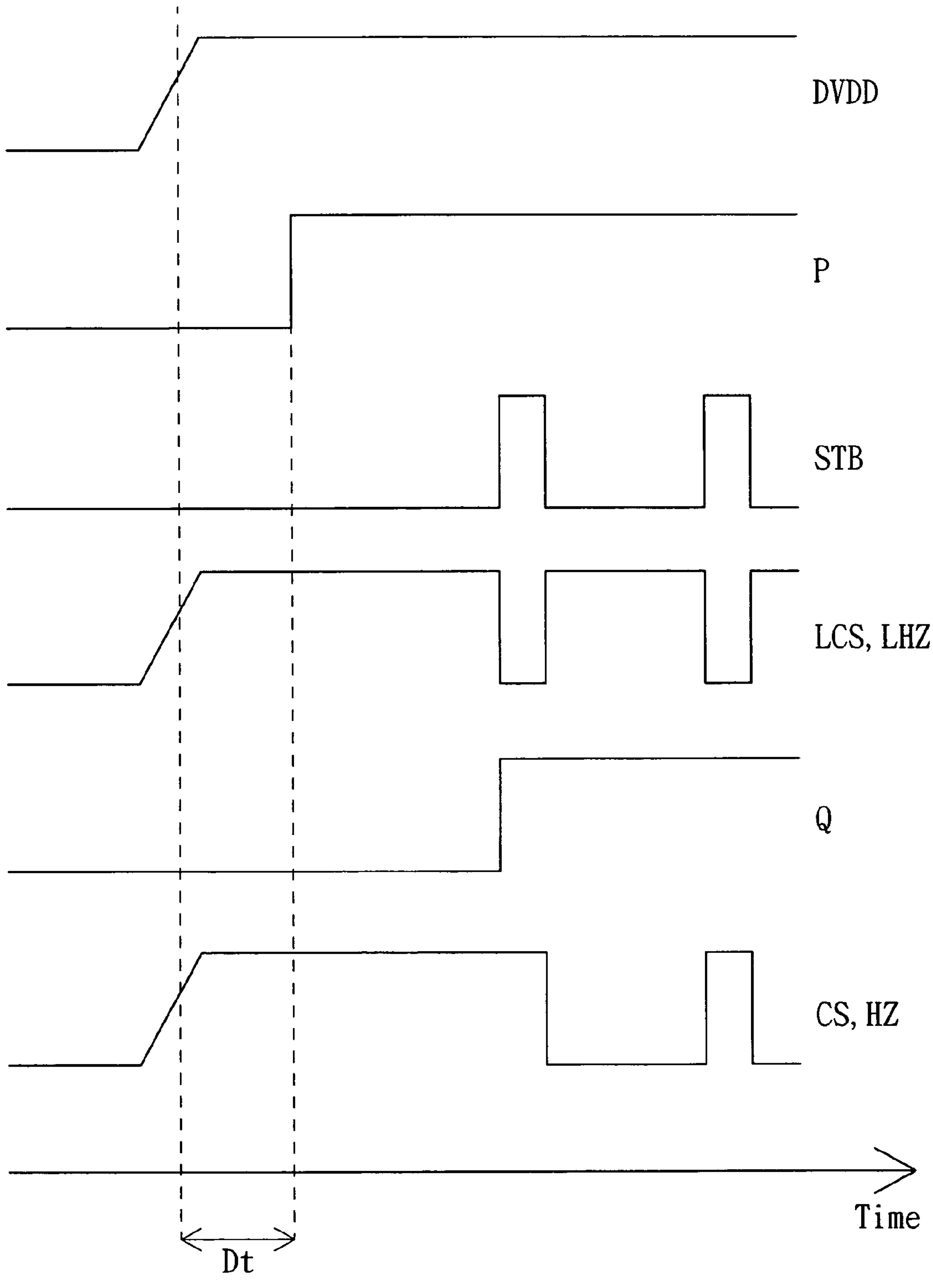
FIG. 4 is a timing diagram of the relevant signals of the power-on screen pattern correcting apparatus in FIG. 2.

Referring to FIG. 4, a timing diagram of the relevant signals of the power-on screen pattern correcting apparatus 200 in FIG. 2 is shown. The level of the power start signal P is related to the level of a power signal DVDD of the source driver 300. When the power signal DVDD has a low signal level, the power start signal P also has the low signal level. After a fixed time Dt when the power signal DVDD is transferred to a high signal level from the low signal level, the level of the power start signal P is lifted to the high signal level.

Therefore, during the fixed time Dt after the power signal DVDD is transferred from the low signal level to the high signal level, the power start signal P is kept at the low signal level such that the inner signal PWG also maintains at the low signal level. The logic units 220 and 230 respectively enable the signals HZ and CS in response to the low level of the inner signal PWG. Thus, the power-on screen pattern correcting apparatus 200 of the embodiment can make the output data initially outputted by a number of output terminals of the source driver to be substantially equal via the signals HZ and CS as the display is powered on and the power-on screen pattern of the display to be substantially uniform.

After the fixed time Dt when the power signal DVDD is transferred from the low signal level to the high signal level, the power start signal P is lifted to the high signal level from the low signal level. Following that, the flip-flop 210 starts to sample the power signal DVDD received at the input terminal D according to the timing signal STB of the source driver 300 received at the timing terminal CLK and uses the sampled value to be the inner signal PWG for output. For example, the timing signal STB is for controlling a line latch of the source driver 300 to start receiving display data. The flip-flop 210 is a positive-edge-triggered flip-flop, which samples the power signal DVDD for transferring the inner signal PWG from the low level to the high level in response to a rising edge of the timing signal STB.

After the power signal DVDD is transferred from the low signal level to the high signal level, the charge-sharing and high-impedance control signals LCS and LHZ have a phase inverse to that of the timing signal STB. Therefore, at a falling edge of the timing signal STB, the charge-sharing and high-impedance control signals LCS and LHZ and the inner signal PWG all have the high signal level. The logic units 220 and 230 make the signals CS and HZ to have a low signal level i.e. disable the signals CS and HZ in response to a high level of the charge-sharing and high-impedance control signals LCS and LHZ and the inner signal PWG. Therefore, in the embodiment, the output terminals 01~0*n* are in a high-impedance state and the charge sharing operation is stopped at the falling edge of the timing signal STB of the line latch. Afterward, the source driver 300 starts to perform a normal display operation of the display according to the data in the line latch.

Although the logic units 220 and 230 are exemplified to be NAND gates for illustration in the embodiment, the logic units 220 and 230 are not limited to NAND gates, and can be any other logic unit which generates the signal HZ in response to the high-impedance control signal LHZ and inner signal PWG and generates the signal CS in response to the charge-sharing control signal LCS and inner signal PWG. The flip-flop 210 of the embodiment is not limited to a rising-edge-triggered flip-flop and can be a flip-flop with any other trigger type, such as a falling-edge-triggered flip-flop.

The source driver and the power-on screen pattern correcting apparatus of the embodiment generate a first signal and a second signal according to the original power start signal, high-impedance control signal and charge-sharing control signal of the source driver via a simple logic circuit. When the display is started, the output terminals of the source driver enter the high-impedance state and are coupled to each other via the charge sharing line such that the output data initially outputted by the output terminals is substantially equal and the power-on screen pattern of the display is substantially uniform. Therefore, the source driver and the power-on screen pattern correcting apparatus of the embodiment can effectively improve the conventional issue that the source driver requires a larger area and higher cost for correcting the power-on screen pattern of the display, has substantially the advantages of using smaller area and lower cost, and can achieve the purpose of correcting the power-on screen pattern of the display by using the original signals.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power-on screen pattern correcting apparatus, for correcting a plurality of pieces of start output data of a plurality of output terminals of a source driver such that a power-on screen pattern of a display is substantially uniform, the power-on screen pattern correcting apparatus comprising:

- a flip-flop, for controlling a level of an inner signal to be substantially equal to a low signal level in response to a low level of a power start signal;
- a first logic unit, for enabling a first signal in response to the low level of the inner signal or a low level of a high-impedance control signal; and
- a second logic unit, for enabling a second signal in response to the low level of the inner signal or a low level of a charge-sharing control signal;
- wherein when the first signal is enabled, the output terminals of the source driver are in a high-impedance state;
- wherein when the second signal is enabled, the output terminals are coupled to a charge sharing line such that all the start output data is substantially equal and the power-on screen pattern is substantially uniform.

2. The power-on screen pattern correcting apparatus according to claim 1, wherein when the power start signal has a high signal level, and the flip-flop samples a power signal of the source driver in response to a triggering edge of a data start signal to generate the inner signal;

- wherein the power start signal is lifted to the high signal level at a fixed time after the power signal substantially rises up to the high signal level.

3. The power-on screen pattern correcting apparatus according to claim 2, wherein the triggering edge is a rising edge.

4. The power-on screen pattern correcting apparatus according to claim 1, wherein the source driver further comprises:

- a plurality of first switch units, each of the first switch units comprising a first terminal coupled to the corresponding output terminal, a second terminal coupled to an output buffer of the source driver, and a control terminal for receiving the first signal, wherein when the first signal is enabled, the first switch units are open such that the output terminals and the output buffers are open and the output terminals are in the high-impedance state.

5. The power-on screen pattern correcting apparatus according to claim 4, wherein the first switch units are implemented by complementary metal oxide semiconductor (CMOS) transistors.

6. The power-on screen pattern correcting apparatus according to claim 1, wherein the source driver further comprises:

- a plurality of second switch units, each of the second switch units comprising a first terminal coupled to the corresponding output terminal, a second terminal coupled to the charge sharing line, and a control terminal for receiving the second signal, wherein when the second signal is enabled, the second switch units are close such that the output terminals are substantially coupled to the charge sharing line, all the start output data is substantially equal, and the power-on screen pattern is substantially uniform.

7. The power-on screen pattern correcting apparatus according to claim 6, wherein the first switch units are implemented by CMOS transistors.

8. The power-on screen pattern correcting apparatus according to claim 1, wherein the first logic unit and the second logic unit are NAND gates.

9. A source driver, applied in a display for generating a plurality of pieces of start output data substantially equal such that a power-on screen pattern of the display is substantially uniform, the source driver comprising:

- a charge sharing line;
- a plurality of output buffers;
- a plurality of output terminals, for outputting the start output data;
- a power-on screen pattern correcting apparatus, comprising:
  - a flip-flop, for controlling a level of an inner signal to substantially equal to a low signal level in response to a low level of a power start signal;
  - a first logic unit, for enabling a first signal in response to the low level of the inner signal or a low level of a high-impedance control signal; and
  - a second logic unit, for enabling a second signal in response to the low level of the inner signal or a low level of a charge-sharing control signal;
- a plurality of first switch units, each of the first switch units comprising a first terminal coupled to the corresponding output terminal, a second terminal coupled to the corresponding output buffer and a control terminal for receiving the first signal, wherein when the first signal is enabled, the first switch units are open such that the output terminals and the output buffers are open, and the output terminals are in a high-impedance state; and
- a plurality of second switch units, each of the second switch units comprising a first terminal coupled to the corresponding output terminal, a second terminal coupled to the charge sharing line, and a control signal for receiving the second signal, wherein when the second signal is enabled, the second switch units are close such that the output terminals are substantially coupled to the charge sharing line, all the start output data is substantially equal and the power-on screen pattern is substantially uniform.

10. The source driver according to claim 9, wherein when the power start signal has a high signal level, and the flip-flop samples a power signal of the source driver in response to a triggering edge of a data start signal to generate the inner signal;

wherein the power start signal is lifted to the high signal level at a fixed time after the power signal substantially rises up to the high signal level.

11. The source driver according to claim 10, wherein the triggering edge is a rising edge.

* * * * *